J. E. MORGAN.
HARROW.
No. 66,869.
PATENTED JULY 16, 1867.
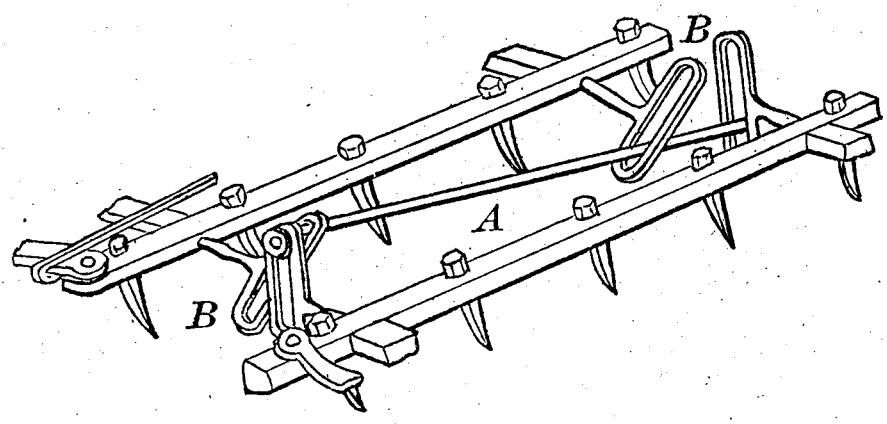
ONLY DRAWING ACCESSIBLE
TAKEN FROM PATENT OFFICE REPORT
1867 — VOL. IV.

United States Patent Office.

JOHN E. MORGAN, OF DEERFIELD, NEW YORK.

Letters Patent No. 66,869, dated July 16, 1867.

---

IMPROVEMENT IN HARROWS.

---

The Schedule referred to in these Letters Patent and making part of the same.

---

TO ALL WHOM IT MAY CONCERN:

Be it known that I, JOHN E. MORGAN, of Deerfield, in the county of Oneida, and State of New York, have invented a new and useful Improvement in the Harrow patented by me on the 31st day of March, 1857, and fully described in the specification accompanying the said patent.

By a reference to the aforesaid patent, with the specification and drawings, it will be seen that the coupling by which the two parts of the harrow were connected was by the use of an elongated eye or link, on the ends of rods passing transversely to its frame across the respective parts of the harrow, with a horizontal rod passing midway between the said two parts of the harrow, and through these elongated links, and that these elongated links stand vertically when the harrow is in a horizontal position; and that the construction is such as to allow of the rise and fall of each part of the harrow "perpendicularly," and one part to pass in advance or fall in the rear of the other; but the said elongated coupling-links "standing vertically" no horizontal movement directly from each other was allowed to either part.

My present invention consists in giving to these elongated coupling-links an inclined position instead of a vertical one, the horizontal coupling-rod passing through these links as before, and the harrow being in all respects constructed and operating as before, and as described in my aforesaid specification and drawings accompanying the same, excepting the improvement of inclining the coupling-links as aforesaid. By this improvement each part of the harrow, when in operation, besides the movements before described, is allowed a lateral horizontal movement directly sidewise from the other; and each end of each part aforesaid is allowed this lateral movement without disturbing the position of the other part of the harrow, or the other end of the same part, thus greatly increasing the lateral or zigzag action of the harrow, and greatly promoting the pulverizing of the soil.

The three figures of the annexed drawings illustrate the action of the harrow by means of this improvement. In each of these figures the coupling-links B are shown inclined, as above mentioned, and this inclination is such as that the links cross each other, as shown, that is, the links on one part of the harrow incline in one direction, and those on the other part in the opposite direction; and the extent of the direct lateral movement before mentioned will be in proportion to the length of the links and the degree of inclination.

Figure 1 shows a full view of the harrow when at rest, or drawn equally along without obstruction, the coupling-rod A falling to bottom of the opening in all the links.

Figure 2 shows the position of the coupling-rod when, by some obstruction or other means, the two parts of the harrow are thrust directly apart, equally from end to end; the coupling-rod, to admit this, rising on the outer inclined plane of all the links, and occupying the tops of the spaces, as shown.

Figure 3 shows the position of the coupling-rod when the parts of the harrow are thrust apart at one end only, which may occur at either end or part way in all these positions.

Thus by means of the inclination of these coupling-links as described, an active cross-movement of the harrow is introduced, which is the more active in proportion as the surface of the ground is uneven or rough, where such an action of the harrow is the most needed, and which by the same harrow without this improvement is wholly unattainable.

I usually construct these coupling-links about seven inches in length, and incline them at the top about five inches each in opposite directions, as before stated; but both the length and the degree of inclination may be varied more or less, as the manufacturer may desire.

What I claim as my present invention, is—

The construction and use of the sectional harrow with inclined coupling-links as described, and for the purposes described.

JOHN E. MORGAN.

Witnesses:
  WILLIAM BAKER,
  CHARLES BARNUM.